(12) United States Patent
Liu et al.

(10) Patent No.: US 8,730,611 B2
(45) Date of Patent: May 20, 2014

(54) CONTACT DETECTION

(75) Inventors: Dongming Liu, Eden Prairie, MN (US);
Lin Zhou, Eagan, MN (US); Adam K. Himes, Minneapolis, MN (US); Lee C. Knippenberg, Burnsville, MN (US);
Michael T. Johnson, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 413 days.

(21) Appl. No.: 13/036,184

(22) Filed: Feb. 28, 2011

(65) Prior Publication Data
US 2012/0218659 A1  Aug. 30, 2012

(51) Int. Cl.
G11B 21/02  (2006.01)

(52) U.S. Cl.
USPC .............................. 360/75; 360/31; 360/77.02

(58) Field of Classification Search
None
See application file for complete search history.

(56) References Cited

U.S. PATENT DOCUMENTS

| | | | |
|---|---|---|---|
| 6,008,640 A | 12/1999 | Tan et al. | |
| 6,097,559 A * | 8/2000 | Ottesen et al. | 360/31 |
| 6,822,821 B2 | 11/2004 | Gan et al. | |
| 6,967,805 B1 | 11/2005 | Hanchi et al. | |
| 7,038,875 B2 | 5/2006 | Lou et al. | |
| 7,158,325 B1 * | 1/2007 | Hu et al. | 360/69 |
| 7,215,495 B1 * | 5/2007 | Che et al. | 360/31 |
| 7,292,401 B2 * | 11/2007 | Shen et al. | 360/69 |
| 7,375,914 B1 * | 5/2008 | Dieron et al. | 360/75 |
| 7,564,649 B2 | 7/2009 | Hanchi et al. | |
| 7,649,706 B2 * | 1/2010 | Yang | 360/75 |
| 7,724,461 B1 * | 5/2010 | McFadyen et al. | 360/75 |
| 7,872,828 B1 | 1/2011 | Sutardja et al. | |
| 7,990,641 B2 * | 8/2011 | Tomita | 360/31 |
| 8,144,418 B2 * | 3/2012 | Watanabe | 360/75 |
| 8,203,802 B2 * | 6/2012 | Ehrlich et al. | 360/75 |
| 8,537,488 B2 * | 9/2013 | Kawamoto et al. | 360/75 |
| 2005/0088772 A1 * | 4/2005 | Baumgart et al. | 360/75 |
| 2007/0035881 A1 | 2/2007 | Burbank et al. | |
| 2007/0201155 A1 * | 8/2007 | Iwase | 360/31 |
| 2007/0230034 A1 * | 10/2007 | Kondo | 360/78.04 |
| 2007/0291401 A1 | 12/2007 | Sun et al. | |
| 2008/0239581 A1 * | 10/2008 | Ikai et al. | 360/272 |
| 2008/0253021 A1 | 10/2008 | Pust et al. | |
| 2008/0273260 A1 | 11/2008 | Liu et al. | |

(Continued)

FOREIGN PATENT DOCUMENTS

EP  1526515  4/2005

OTHER PUBLICATIONS

International Search Report and Written Opinion dated Jun. 4, 2012 from PCT Application No. PCT/US2012/023118, 10 pages.

*Primary Examiner* — Dismery Mercedes
(74) *Attorney, Agent, or Firm* — Hollingsworth Davis, LLC

(57) ABSTRACT

A method of detecting a contact between a transducing head and a storage medium is provided. The method applies an input signal, having a select power level and known frequency, to an actuator for actuating the head. An output signal is obtained in response to the input signal. At least one signal component is extracted from the output signal at the same or a harmonic of the same known frequency as the input signal applied to the actuator. Whether the at least one extracted signal component indicates a contact between the head and the medium is determined. The power level of the applied wave pattern is increased incrementally until the extracted signal component indicates a contact between the head and the storage medium.

20 Claims, 4 Drawing Sheets

(56) References Cited

U.S. PATENT DOCUMENTS

| | | | |
|---|---|---|---|
| 2009/0086367 A1* | 4/2009 | Taniguchi et al. | 360/97.02 |
| 2009/0168248 A1* | 7/2009 | Matsumoto et al. | 360/235.7 |
| 2009/0268330 A1* | 10/2009 | Lee et al. | 360/31 |
| 2010/0033860 A1* | 2/2010 | Tomita | 360/31 |

\* cited by examiner

CONTACT DETECTION

BACKGROUND

Data storage devices, such as disc drives, typically store information on surfaces of storage media such as magnetic or optical discs. In a typical disc drive, one or more discs are mounted together on a spindle motor. The spindle causes the disc(s) to spin and the data surfaces of the media to pass under respective head sliders that carry a transducer for reading and writing data to the storage media.

The head sliders fly over the storage media at a fly height. With the continual increase in the recording density of storage devices, the fly height decreases. Because of media surface irregularities and operational conditions, decreased fly heights may result in detrimental contacts of the transducer with the media. While microactuators positioned in the head slider may actively control the clearance between the transducer and the media, one of the main concerns with active clearance control is reliable and wear-free contact detection.

SUMMARY

In one embodiment, a method of detecting a contact between a transducing head and a storage medium is provided. The method applies an input signal, having a select power level and known frequency, to an actuator for actuating the transducing head. An output signal is obtained by a read/write channel in response to the input signal. A controller extracts at least one signal component from the output signal at the same known frequency or a harmonic of the same known frequency as the input signal applied to the actuator. Whether the at least one extracted signal component indicates a contact between the transducing head and the medium is determined. Applying an input signal to the actuator, obtaining an output signal in response to the input signal and extracting the signal component from the output signal are repeated by incrementally increasing the power level of the applied wave pattern until the extracted signal component indicates a contact between the head and the storage medium.

Other features and benefits that characterize embodiments of the present invention will be apparent upon reading the following detailed description and review of the associated drawings.

DETAILED DESCRIPTION

Figure 1:
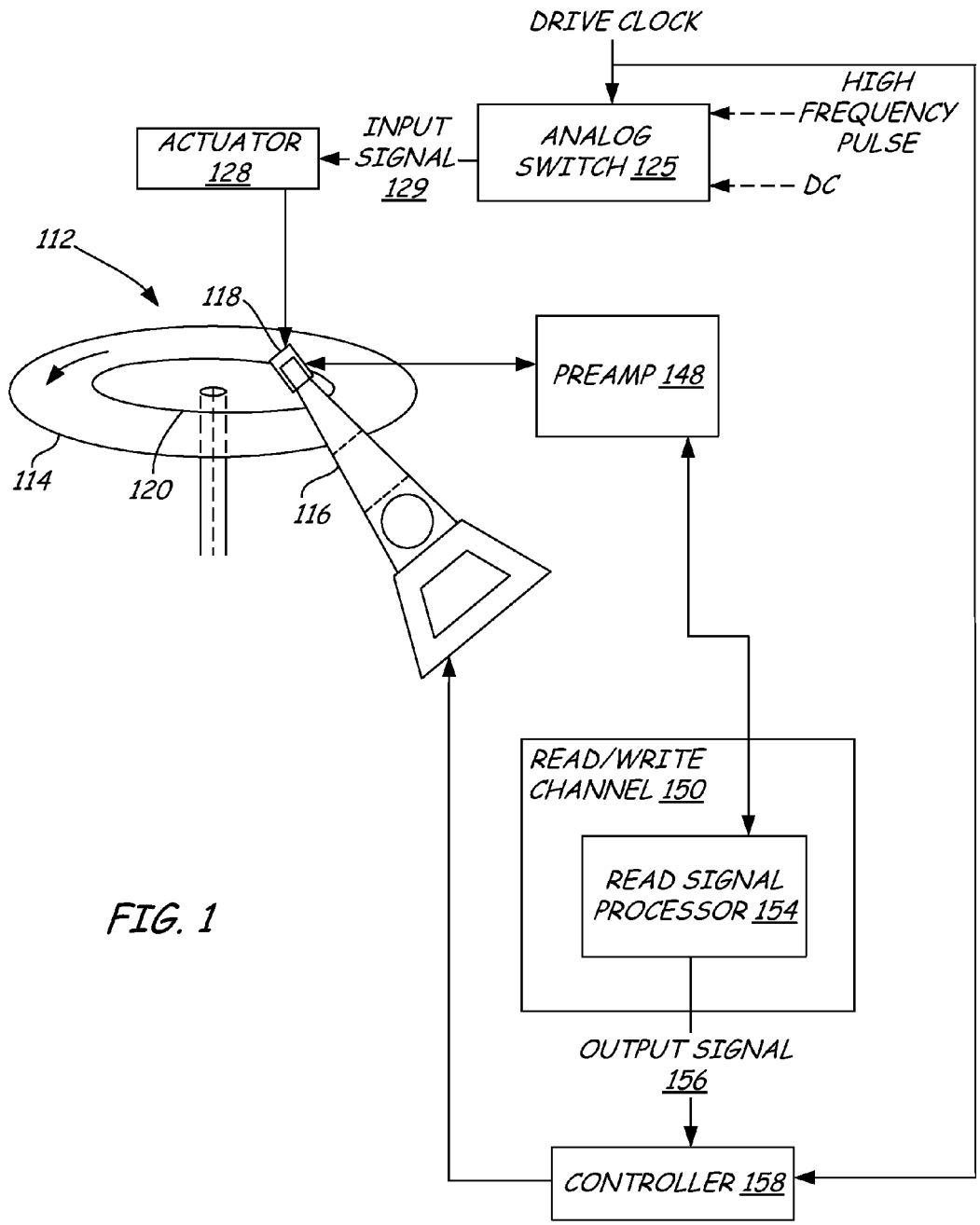
FIG. 1 illustrates a schematic diagram of data storage device under an embodiment.

Embodiments of the disclosure provide a head-to-media contact detection scheme for use when a data storage device is being calibrated. In one embodiment, the disclosed contact detection scheme includes driving an actuator or heater, which is coupled to the transducing head, with a known frequency wave pattern and using a signal processing technique to identify the same frequency signal in a response wave pattern. In another embodiment, the disclosed contact detection scheme includes driving the actuator or heater with a known high frequency pulse wave pattern. Determining when a head-to-media contact occurs when calibrating a data storage device is information that may be used during data storage operation and active clearance control of the head. For example, active clearance control (i.e., using an actuator located in the head, such as a writer heater, to control the space between the media and the head) may be regulated based on the information gathered during calibration.

Two example types of contact detection schemes used in a data storage device calibration include detecting modulation when the head and media contact and detecting the off-track signal measured by a change in position error signal (dPES) caused by the friction when contact of the head against the media is made at a non-zero skew. Position error signal (PES) is a signal that indicates the radial position of a transducing head with respect to the tracks on a rotatable storage medium. In high performance data storage devices, the PES is derived from either a prerecorded servo disc with a corresponding servo head (a dedicated servo system), or from servo information that is embedded on each recording surface among user data blocks at predetermined intervals (an embedded servo system). The transducing head provides the servo information to servo control circuitry which generates the PES with a magnitude that is typically equal to zero when the head is positioned over the center of the track ("on track"), and is linearly proportional to a relative off-track distance between the head and the center of the track.

Detecting contact using modulation, such as by Integrated Peak Detection (IPD), is more sensitive than detecting contact using the dPES method if the interface of the head and media has a large enough contact modulation. If the interface of the head and media has low modulation, the dPES signal may be the only signal available for detecting contact. In addition, detecting contact of the head and the media with the dPES signal can be difficult because the dPES signal includes noises from many different sources, such as Repeatable Run Out (RRO), Non-Repeatable Run Out (NRRO), FOS heating (i.e., the heating of the flexible cable on the suspension which supports the head) and windage in the data storage device.

The interface between the head and media is under constant study and developments have been made that continue to decrease the head-to-media space for higher area density media. One key feature of these developments is a low modulation at contact. Such an interface makes detecting a head-to-media contact using modulation a great challenge. Disclosed is a contact detection that uses the available PES signal but with a high signal-to-noise ratio (SNR), especially where low modulation contact is common.

FIG. 1 is a simplified block diagram of a data storage device 112 in accordance with embodiments of the disclosure. Data storage device 112 includes storage medium 114, a suspension 116 supporting a transducing head 118 that can read and write data to a track 120 on the medium 114. The storage medium 114 is illustrated as being a rotatable disc. Data storage device 112 also includes a preamplifier (preamp) 148 for generating a write signal applied to transducing head 118 during a write operation, and for amplifying a read signal emanating from transducer 118 during a read operation.

Coupled to transducing head 118 includes a read/write channel 150 that receives user data during a write operation and processes a read signal magnified by preamp 148 with a read signal processor 154. Besides read signal processor 154 obtaining, detecting and decoding user data recorded on storage medium 114 in the form of a read signal, read signal processor 154 can also obtain and detect a position error signal (PES) that indicates how far the transducing head is off-track. The read signal that indicates user data or off-track data are considered to be the output signal 156 illustrated in FIG. 1. The output signal 156 is received by controller 158. Controller 158 includes a processor and can access memory for use in processing an algorithm for detecting a contact between transducing head 118 and storage medium 114. Controller 158 will be discussed below in conjunction with FIG. 2.

Transducing head 118 includes an actuator 128, such as a heater, for moving a transducing element, such as a read element or write element, closer to storage medium 114. In one embodiment, analog switch 125, which can include a drive clock for setting a frequency, is fed a DC component (illustrated in dashed lines to show a first embodiment), which powers the actuator 128. The signal supplied to the actuator 128 from the analog switch 125 is an input signal or reference signal 129. Read/write channel 150 produces output signal 156 in response to the input signal 129.

However, the frequency from a DC component can have certain considerations due to the slow response of heater actuation. The thermal time constant of the heater (i.e., the rise time that characterizes the response of the heater to a time-varying input) is estimated to be greater than 100 µs. Full protrusion (i.e., when the actuator or heater is fully protruded) is about five times the time constant. Therefore, the heater driving frequency is approximately 1 kHz or less if full protrusion is intended. It should be noted that once the head is away from contact and the actuator or heater is retracting, no contact response signal is generated. Therefore, only half of the time response signal was generated with the DC component. Therefore, in another embodiment, a very high frequency (relative to its time constant) pulse can be applied to the actuator or heater. Such a pulse means that the heating caused by power on and the cooling caused by power off (the pulse) would not be a complete cycle as is the case in DC. In fact, the heater can only protrude a fraction of the maximum at the equivalent DC power. The effect of the high frequency pulse is close to DC in terms of providing power, but the thermal perturbation of this embodiment produces an Angstrom level modulation. The protrusion of the heater would be equivalent to what is caused by the DC power—the average of the power of the pulse train. Thus, the DC voltage is approximately 0.707 times of the maximum voltage of the pulse, assuming the duty cycle (i.e., the time frequency of the pulse on) is 50%.

Figure 2:
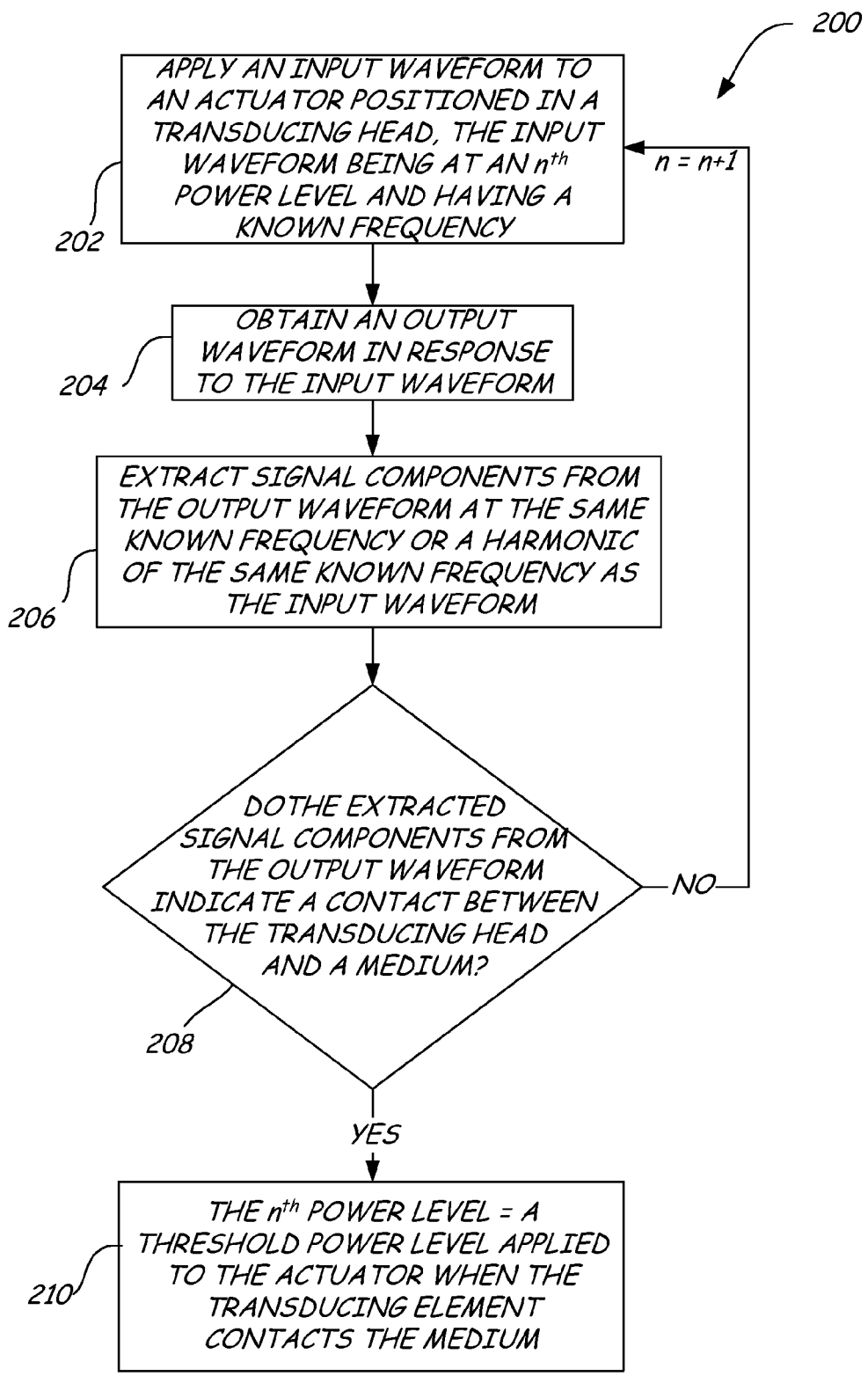
FIG. 2 illustrates a method of detecting a contact between the transducing head and the storage medium illustrated in FIG. 1.

FIG. 2 illustrates a method 200 of detecting a contact between transducing head 118 and storage medium 114. At block 202, an input signal or reference signal ($V_{ref}$) is applied to actuator 128, such as a heater, positioned in a transducing head from an analog switch 125. The actuator 128 is configured to move the transducing head such as to control the spaced distance between transducing head 118 and storage medium 114. The input signal or reference signal includes a select power level (i.e., an $n^{th}$ power level) and a known frequency. The select power level and known frequency are stored in a memory for access by controller 158 in later use. At block 204, an output signal ($V_{sig}$) is obtained in response to the input signal or reference signal. The output signal is represented by:

$$V_{sig} = A \cos(\omega_1 t + \phi) \qquad \text{Eqn. 1}$$

Where A is amplitude, $\omega_1$ is frequency, t is time and $\phi$ is phase. The input signal can be represented as follows:

$$V_{ref} = B \cos(\omega_2 t) \qquad \text{Eqn. 2}$$

where B is amplitude, $\omega_2$ is frequency and t is time.

At block 206, controller 158 extracts signal components from the output signal at the same known frequency or a harmonic of the same known frequency as the input signal applied to the actuator. As illustrated in FIG. 1 and previously mentioned, the drive clock frequency is fed to controller 158 so that it obtains the known frequency and stores it. Therefore:

$$\omega_1 = \omega_2 \qquad \text{Eqn. 3}$$

For example, the signal components of amplitude and phase can be extracted at the fixed frequency from the output signal by using the input signal at the same frequency or harmonic of the same known frequency. The product of the output signal and the input signal gives the modulated signal of:

$$V_{sig} * V_{ref} = \qquad \text{Eqn. 4}$$
$$\frac{1}{2} A * B * \cos((\omega_1 - \omega_2)t + \phi) + \frac{1}{2} A * B * \cos((\omega_1 + \omega_2)t + \phi)$$

The first term is a DC component and the second term is a signal with twice the frequency of the output signal. The resulting DC signal represented in equation 4 can be demodulated by filtering out the high frequency component such that the DC signal is only related to the amplitudes (i.e., A and B) of the output signal and input signal and the phase differences between them. The amplitude and phase of the DC signal can be separated using a second reference signal that is 90 degrees out of phase from the first reference signal and the amplitude and phase can be calculated from the two DC outputs.

In the embodiment where a high frequency pulse is provided, the modulation amplitude can be adjusted by varying pulsing frequency and the duty cycle as follows:

$$\frac{\Delta T}{T_{max}} = 1 - e^{-(1-D)/\tau} \qquad \text{Eqn. 5}$$

where D is the duty cycle and τ is time or period. For example, the modulation amplitude can be set to be close to the thickness of lube disposed on a surface of a storage medium to thereby have head and lube interact at heater contact power.

At block 208, controller 158 determines whether the extracted signal components from the output signal indicate a contact between transducing head 118 and the storage medium 114. In particular, the extracted or measured amplitude of the output signal at the known frequency or a harmonic of the known frequency is compared to a threshold amplitude. If the extracted amplitude of the output signal is less than the threshold amplitude, then the method 200 passes back to block 202 and the power level of the input signal applied to the actuator is increased to the next power level. For example, if the power level was set at a first power level, then the next power level is a second power level. Blocks 202, 204, 206 and 208 are repeated and power levels are incrementally increased until the extracted amplitude indicates a contact between the transducing head and the storage medium. If the extracted amplitude of the input signal is greater than the threshold amplitude, then the method 200 passes to block 210. At block 210, the power level of the input signal applied to the actuator is the threshold power level at which the transducing head will contact the medium. This information can be stored in controller 158 so as to be used during normal operation of data storage device 112. In other words, controller uses this information such that actuator 128 is not powered at the threshold power level at which it will cause the transducing head to contact medium 114.

Figure 3:
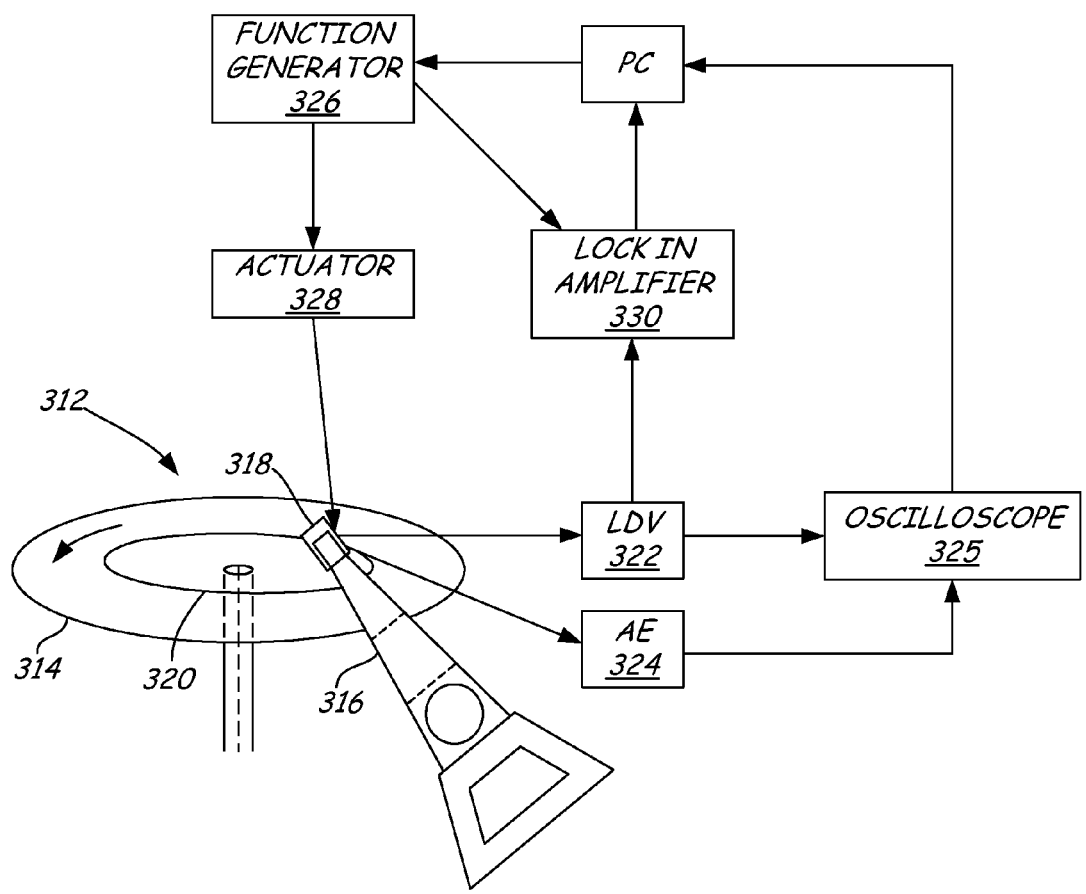
FIG. 3 illustrates a schematic diagram of the experimental set up of a data storage device for applying the method illustrated in FIG. 2.

The following experiments were developed illustrating that the method 200 can accurately determine contact between the transducing head, such as transducing head 118, and the storage medium, such as storage medium 114. FIG. 3 illustrates a schematic diagram of a data storage device 312 and the experiment set up. Data storage device 312 includes a storage medium 314, a suspension 316 supporting a transducing head 318 that can read and write data to a track 320 on the medium 314. Coupled to transducing head 318 includes a Laser Doppler Velocimeter (LDV) 322 for measuring the off-track signal because the drive PES signal is not available at this rudimentary component level. Also coupled to transducing head 318 includes an acoustic emission (AE) sensor 324. Oscilloscope 325, such as a Lecroy Oscilloscope, collects the signals from LDV 322 and AE sensor 324.

A programmable function generator 326 is used to power the actuator 328 (configured to actuate transducing element in transducing head 318) at any fixed frequency. Function generator 326 also sends out a reference signal to lock-in amplifier 330 so that the lock-in amplifier measures the amplitude of the LDV response at the reference frequency.

A first experiment was conducted with a transducing head that has a fair amount of modulation at contact at five different frequency levels: 100 Hz, 500 Hz, 190 Hz, 167 Hz and 162 Hz. The AE sensor 324 can easily pick up the contact event and it is detected at about the same power.

Figure 4:
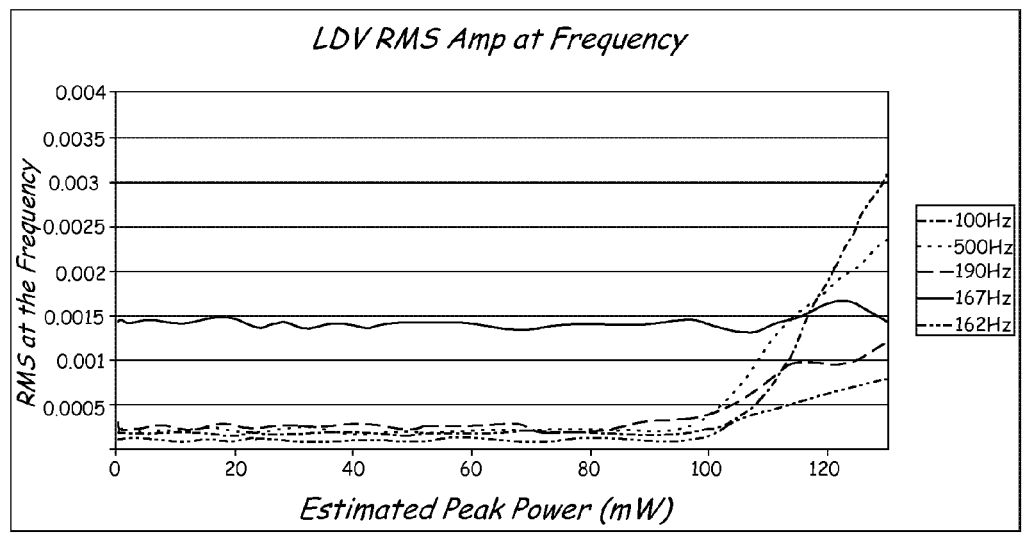
FIG. 4 illustrates a graphical representation of a first experiment run using the set up illustrated in FIG. 3.

FIG. 4 illustrates the off-track signal of LDV vs. actuator power. Contacts at the different frequencies are clearly seen as indicated by the sharp rising of the LDV amplitude at each frequency except for the 167 Hz frequency. It should be realized that in the first experiment, the frequency of 167 Hz matches the frequency of the spinning rotatable medium 314. The noise at this frequency is the rotatable medium run out. For any domain approach, such as amplitude RMS, the run out noise would be part of the baseline noise. The algorithm has a very narrow band to pick up a target frequency. In the first experiment, the algorithm effectively recovered the signal just 5 Hz away (at 162 Hz) from the spindle run out. It can also be seen that higher frequency provided a steep slope (higher SNR). Such high SNR can be caused by the fact that LDV 322 is measuring velocity instead of displacement. If a PES signal were used on data storage device 312, the slopes should be the same. However, a higher frequency reduces the real head-to-media contact time when detecting a contact.

A second experiment was conducted with a transducing head designed for high pressure (i.e., for Beyond Contact Recording (BCR)). Such a transducing head was designed to remove the modulation at contact with the storage medium. The AE sensor 324 illustrated in FIG. 4 has a difficult time picking up the contact due to lack of modulation. In this experiment, the actuator, such as actuator 328 was driven at approximately 1 kHz. The method illustrated in FIG. 2 may still detect the contact.

Figure 5:
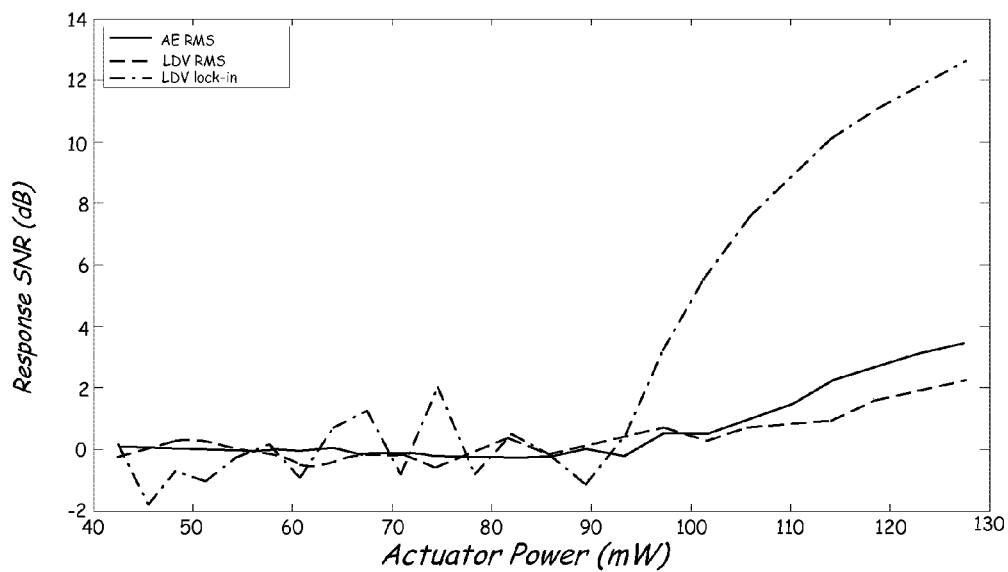
FIG. 5 illustrates a graphical representation of a second experiment run using the set up illustrated in FIG. 4.

Signal to noise ratio (SNR) was calculated for the method illustrated in FIG. 2 (i.e., LDV lock-in) and the AE/LDV RMS of other methods. FIG. 5 illustrates the differences. Both AE RMS and LDV RMS had a very low SNR comparing to the method illustrated in FIG. 2.

The contact detection scheme illustrated in FIG. 2 applies a known frequency wave signal to an actuator positioned in a transducing head instead of simply ramping up power. The dPES or other read signal in response to the input signal can be picked up by a controller 158. Experiments conducted showed the contact detection scheme may have a better SNR over a normal dPES contact detection scheme. It also may have showed better current modulation based contact detection on a very low modulation transducing head. The scheme also may cause less contact induced wear because the transducing head contact time with the storage medium is much less when an AC waveform is applied instead of DC power or high frequency pulse. The contact detection scheme may be implemented in the drive or component level.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of detecting a contact between a transducing head and a storage medium, the method comprising:
applying an input signal to an actuator for actuating the transducing head, the input signal having a select power level and a known frequency;
obtaining an output signal in response to the input signal;
extracting at least one signal component from the output signal at the same known frequency or a harmonic of the same known frequency as the input signal applied to the actuator;
determining whether the at least one extracted signal component indicates a contact between the transducing head and the medium; and
repeating the applying the input signal to the actuator, obtaining an output signal in response to the input signal and extracting the at least one signal component from the output signal by increasing the power level of the applied wave pattern until the at least one extracted signal component indicates a contact between the transducing head and the storage medium.

2. The method of claim 1, wherein the output signal comprises a position error signal (PES).

3. The method of claim 1, wherein the output signal comprises a read signal.

4. The method of claim 1, wherein determining whether the at least one extracted signal component indicates a contact between the transducing head and the medium comprises determining that the contact occurred when the at least one extracted signal component has a value that is greater than a threshold value.

5. The method of claim 4, wherein when the at least one extracted signal component indicates the contact occurred, then determining the contact occurred at the select power level.

6. The method of claim 1, wherein the input signal applied to the actuator having the select power level and the known frequency comprises a DC component.

7. The method of claim 1, wherein the input signal applied to the actuator having the select power level and the known frequency comprises a high frequency pulse component.

8. The method of claim 1, wherein the at least one extracted signal component comprises an amplitude and wherein determining if the at least one extracted signal component indicates a contact between the transducing element and the medium comprises determining that a contact occurred if the amplitude of the output signal is greater than an amplitude threshold value.

9. The method of claim 1, wherein the actuator comprises a heater positioned in the transducing head.

10. A method of detecting a contact between a transducing head and a storage medium, the method comprising:
- applying an input signal to an actuator for actuating the transducing head, the input signal having a select power level and a known frequency;
- obtaining an output signal in response to the input signal;
- extracting at least one signal component from the output signal at the same known frequency or a harmonic of the same known frequency as the input signal applied to the actuator;
- determining whether the at least one extracted signal component has a value that is greater than a threshold value; and
- repeating the applying the input signal to the actuator, obtaining an output signal in response to the input signal and extracting at least one signal component from the output signal by increasing the power level of the applied wave pattern until the value of the at least one extracted signal component is greater than the threshold value.

11. The method of claim 10, wherein determining whether the at least one extracted signal component has a value that is greater than a threshold value comprises determining whether the at least one extracted signal component indicates a contact between the transducing element and the medium.

12. The method of claim 10, wherein the input signal applied to the actuator having the select power level and the known frequency comprises a DC component.

13. The method of claim 10, wherein the input signal applied to the actuator having the select power level and the known frequency comprises a high frequency pulse component.

14. The method of claim 10, wherein the at least one extracted signal component comprises an amplitude and wherein determining whether the at least one extracted signal component indicates a contact between the transducing element and the medium comprises determining that a contact occurred whether the amplitude of the output signal is greater than an amplitude threshold value.

15. The method of claim 10, wherein the actuator comprises a heater positioned in the transducing head.

16. A device comprising:
- an actuator configured to actuate a transducing head and receive an input signal having a select power level and a known frequency;
- a channel configured to obtain an output signal in response to the input signal;
- a controller configured to:
  - extract at least one signal component from the output signal at the same known frequency or a harmonic of the same known frequency as the input signal applied to the actuator; and
  - determine whether the at least one extracted signal component indicates a contact between the transducing head and a surface.

17. The data storage device of claim 16, wherein the output signal comprises a position error signal (PES).

18. The data storage device of claim 16, wherein the output signal comprises a read signal.

19. The data storage device of claim 16, wherein the actuator comprises a heater positioned in the transducing head.

20. The data storage device of claim 16, wherein the controller determines whether the at least one extracted signal component indicates a contact between the transducing head and the medium when the at least one extracted signal component from the output signal has a value that is greater than a threshold value.

* * * * *